(12) United States Patent
Sun et al.

(10) Patent No.: US 10,104,654 B2
(45) Date of Patent: Oct. 16, 2018

(54) FUTURE-COMPATIBLE GROUP COMMON DOWNLINK CONTROL CHANNEL

(71) Applicant: QUALCOMM Incorporated, San Diego, CA (US)

(72) Inventors: Jing Sun, San Diego, CA (US); Heechoon Lee, San Diego, CA (US); Peter Pui Lok Ang, San Diego, CA (US); Tingfang Ji, San Diego, CA (US); Peter Gaal, San Diego, CA (US); Wanshi Chen, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/711,528

(22) Filed: Sep. 21, 2017

(65) Prior Publication Data

US 2018/0234950 A1  Aug. 16, 2018

Related U.S. Application Data (60) Provisional application No. 62/460,024, filed on Feb. 16, 2017.

(51) Int. Cl.
| | | |
|---|---|---|
| *H04L 12/28* | (2006.01) | |
| *H04W 72/04* | (2009.01) | |
| *H04J 1/16* | (2006.01) | |

(52) U.S. Cl.
CPC .................... *H04W 72/042* (2013.01)

(58) Field of Classification Search
USPC ................... 370/252, 329, 442, 430
See application file for complete search history.

(56) References Cited

U.S. PATENT DOCUMENTS

| 2009/0116427 A1 | 5/2009 | Marks et al. |
| 2010/0322154 A1 | 12/2010 | Chen et al. |

(Continued)

OTHER PUBLICATIONS

Mediatek Inc: "Common PDCCH Design", 3GPP Draft; R1-1702717, Feb. 12, 2017, XP051209864, pp. 1-6, Retrieved from the Internet: URL:http://www.3gpp.org/ftp/MeetIngs_3GPP_SYNC/RAN1/Docs/ [retrieved on Feb. 12, 2017].

(Continued)

*Primary Examiner* — John Pezzlo
(74) *Attorney, Agent, or Firm* — Qualcomm IP Dept.; James Hunt Yancey, Jr.; Norton Rose Fulbright (57) ABSTRACT

Wireless communication with a future-compatible group common downlink control channel is discussed. A common downlink control channel may include a plurality of regions that may be configured to include information describing a plurality of features, at least a subset of the features being supported by a mobile device. Configuration information associated with the common control channel may be transmitted from a base station to the mobile device. The configuration information may provide to the mobile device an indication of the plurality of features described in the common control channel and an indication of how the plurality of features are configured in the plurality of regions of the common control channel. After receiving the common control channel, the mobile device may process the regions of the control channel that include control information features supported by the mobile device and skip regions of the common control channel that include control information features not supported by the mobile device.

26 Claims, 7 Drawing Sheets

(56) References Cited

U.S. PATENT DOCUMENTS

2015/0245246 A1* 8/2015 Golitschek ............ H04L 5/0094
370/280
2017/0135084 A1* 5/2017 Kuchibhotla ......... H04L 5/0007

OTHER PUBLICATIONS

Panasonic: "Discussion on Group Common PDCCH", 3GPP Draft: R1-1702764, Feb. 12, 2017, XP051209911, pp. 1-5, Retrieved from the Internet: URL: http://www.3gpp.org/ftp/Meetings_3GPP_SYNC/RAN1/Docs/ [retrieved on Feb. 12, 2017].
International Search Report and Written Opinion—PCT/US2018/014206—ISA/EPO—dated Apr. 16, 2018.

* cited by examiner

FUTURE-COMPATIBLE GROUP COMMON DOWNLINK CONTROL CHANNEL

CROSS-REFERENCE TO RELATED APPLICATIONS

This application claims the benefit of U.S. Provisional Patent Application No. 62/460,024, entitled "FUTURE-COMPATIBLE GROUP COMMON DOWNLINK CONTROL CHANNEL," filed on Feb. 16, 2017, which is expressly incorporated by reference herein in its entirety.

TECHNICAL FIELD

Aspects of the present disclosure relate generally to wireless communication systems, and more particularly, to a future-compatible group common downlink control channel. Certain embodiments of the technology discussed below can enable and provide enhanced communication features and techniques for communication systems, including higher data rates, higher capacity, better spectral efficiency, and lower device power.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

BRIEF SUMMARY OF SOME EMBODIMENTS

Typically, communication networks include numerous physical channels over which devices in the communication networks, such as base stations and mobile devices, may communicate information to each other. A group common downlink control channel (or simply a common control channel), as described in the present disclosure, may refer to a channel that includes information that is common for a group of mobile devices. Using a common downlink control channel for communicating control information to a group of mobile devices may bring about numerous improvements to communication networks and the devices that utilize the communication networks. For example, a common downlink control channel may improve data rates, capacity, and spectral efficiency because more bandwidth may be allocated for data and less bandwidth may be allocated for UE-specific control information that is actually common for a group of mobile devices. In addition, when mobile devices are made aware of the location of the common downlink control channel before communication over the common downlink control channel occurs, power usage of the mobile devices may be reduced because the mobile devices may reduce the amount of blind decoding they perform, if any is performed.

Aspects of the present disclosure may improve wireless communication through the development of a common downlink control channel. Aspects of the present disclosure may also improve wireless communication by making the common downlink control channel configurable. The configurability of the common downlink control channel may make the channel future-compatible by allowing future changes to be made to the channel simply through modification of the configuration parameters of the channel. In some scenarios, dynamic adjustments and configurability may be provided so that further developments related to communication channels may be utilized. As one example, configurations of a payload length can be configurable leading to adjustments of control aspects. Communication specifications may set forth various approaches of configurable lengths as well as defining bits within a payload transmission.

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes receiving, by a processor, configuration information associated with a future-compatible control channel. The configuration information may provide an indication of a plurality of features described in the control channel and an indication of how the plurality of features are configured in a plurality of regions of the control channel. The method may also include receiving, by the processor, the control channel, wherein the control channel is common for a group of mobile devices. The method may further include processing, by the processor, one or more of the plurality of regions of the control channel that are associated with one or more of the plurality of features supported by the mobile device and not processing one or more of the plurality of regions of the control channel that are associated with one or more of the plurality of features not supported by the mobile device.

In an additional aspect of the disclosure, an apparatus configured for wireless communication includes a means for receiving, by a processor, configuration information associated with a future-compatible control channel. The configuration information may provide an indication of a plurality of features described in the control channel and an indication of how the plurality of features are configured in a plurality of regions of the control channel. The apparatus may also include a means for receiving, by the processor, the control channel, wherein the control channel is common for a group of mobile devices. The apparatus may further include a means for processing, by the processor, one or more of the plurality of regions of the control channel that are associated with one or more of the plurality of features supported by the mobile device and not processing one or more of the plurality of regions of the control channel that are associated with one or more of the plurality of features not supported by the mobile device.

In an additional aspect of the disclosure, a computer program product has a computer-readable medium having program code recorded thereon. This program code includes code for causing a computer to receive configuration information associated with a future-compatible control channel. The configuration information may provide an indication of a plurality of features described in the control channel and an indication of how the plurality of features are configured in a plurality of regions of the control channel. The program code may also include program code for causing the computer to receive the control channel, wherein the control channel is common for a group of mobile devices. The program code may further include program code for causing the computer to process one or more of the plurality of regions of the control channel that are associated with one or more of the plurality of features supported by the mobile device and not processing one or more of the plurality of regions of the control channel that are associated with one or more of the plurality of features not supported by the mobile device.

In an additional aspect of the disclosure, an apparatus includes at least one processor and a memory coupled to the processor. The processor is configured to receive configuration information associated with a future-compatible control channel. The configuration information may provide an indication of a plurality of features described in the control channel and an indication of how the plurality of features are configured in a plurality of regions of the control channel. The processor is also configured to receive the control channel, wherein the control channel is common for a group of mobile devices. The processor is further configured to process one or more of the plurality of regions of the control channel that are associated with one or more of the plurality of features supported by the mobile device and not processing one or more of the plurality of regions of the control channel that are associated with one or more of the plurality of features not supported by the mobile device.

In one aspect of the disclosure, a method of wireless communication includes configuring, by a processor, a plurality of regions of a future-compatible control channel to include information describing a plurality of features. A subset of the plurality regions of the control channel may be configured to include information describing one or more of the plurality of features that are supported by a mobile device. The method may also include transmitting, by the processor, configuration information associated with the control channel, wherein the transmitted configuration information provides to the mobile device an indication of the plurality of features described in the control channel and an indication of how the plurality of features are configured in the plurality of regions of the control channel. The method may further include transmitting, by the processor, the control channel, wherein the control channel is common for a group of mobile devices.

In an additional aspect of the disclosure, an apparatus configured for wireless communication includes a means for configuring, by a processor, a plurality of regions of a future-compatible control channel to include information describing a plurality of features. A subset of the plurality regions of the control channel may be configured to include information describing one or more of the plurality of features that are supported by a mobile device. The apparatus may also include a means for transmitting, by the processor, configuration information associated with the control channel, wherein the transmitted configuration information provides to the mobile device an indication of the plurality of features described in the control channel and an indication of how the plurality of features are configured in the plurality of regions of the control channel. The apparatus may further include a means for transmitting, by the processor, the control channel, wherein the control channel is common for a group of mobile devices.

In an additional aspect of the disclosure, a computer program product has a computer-readable medium having program code recorded thereon. This program code includes code for causing a computer to configure a plurality of regions of a future-compatible control channel to include information describing a plurality of features. A subset of the plurality regions of the control channel may be configured to include information describing one or more of the plurality of features that are supported by a mobile device. The program code may also include program code for causing the computer to transmit configuration information associated with the control channel, wherein the transmitted configuration information provides to the mobile device an indication of the plurality of features described in the control channel and an indication of how the plurality of features are configured in the plurality of regions of the control channel. The program code may further include program code for causing the computer to transmit the control channel, wherein the control channel is common for a group of mobile devices.

In an additional aspect of the disclosure, an apparatus includes at least one processor and a memory coupled to the processor. The processor is configured to configure a plurality of regions of a future-compatible control channel to include information describing a plurality of features. A subset of the plurality regions of the control channel may be configured to include information describing one or more of the plurality of features that are supported by a mobile device. The processor is also configured to transmit configuration information associated with the control channel, wherein the transmitted configuration information provides to the mobile device an indication of the plurality of features described in the control channel and an indication of how the plurality of features are configured in the plurality of regions of the control channel. The processor is further configured to transmit the control channel, wherein the control channel is common for a group of mobile devices.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces. For example, next generation networks (e.g., 5G networks and beyond) are being designed to support features such as high bandwidth operations, as discussed in 3GPP Release 14/15 forward.

While aspects and embodiments are described in this application, those skilled in the art will understand that implementations and use cases may come about in many different arrangements and scenarios. Innovations described herein may be implemented across many differing platform types, for example, via integrated chip embodiments and other non-module-component based devices (end-user devices, vehicles, communication devices, etc.). While some claims may or may not be specifically directed to particular use cases or applications, a wide assortment of applicability of the innovation may take place. Ranging from modular components to whole devices incorporating aspects of the described innovations.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

Figure 1:
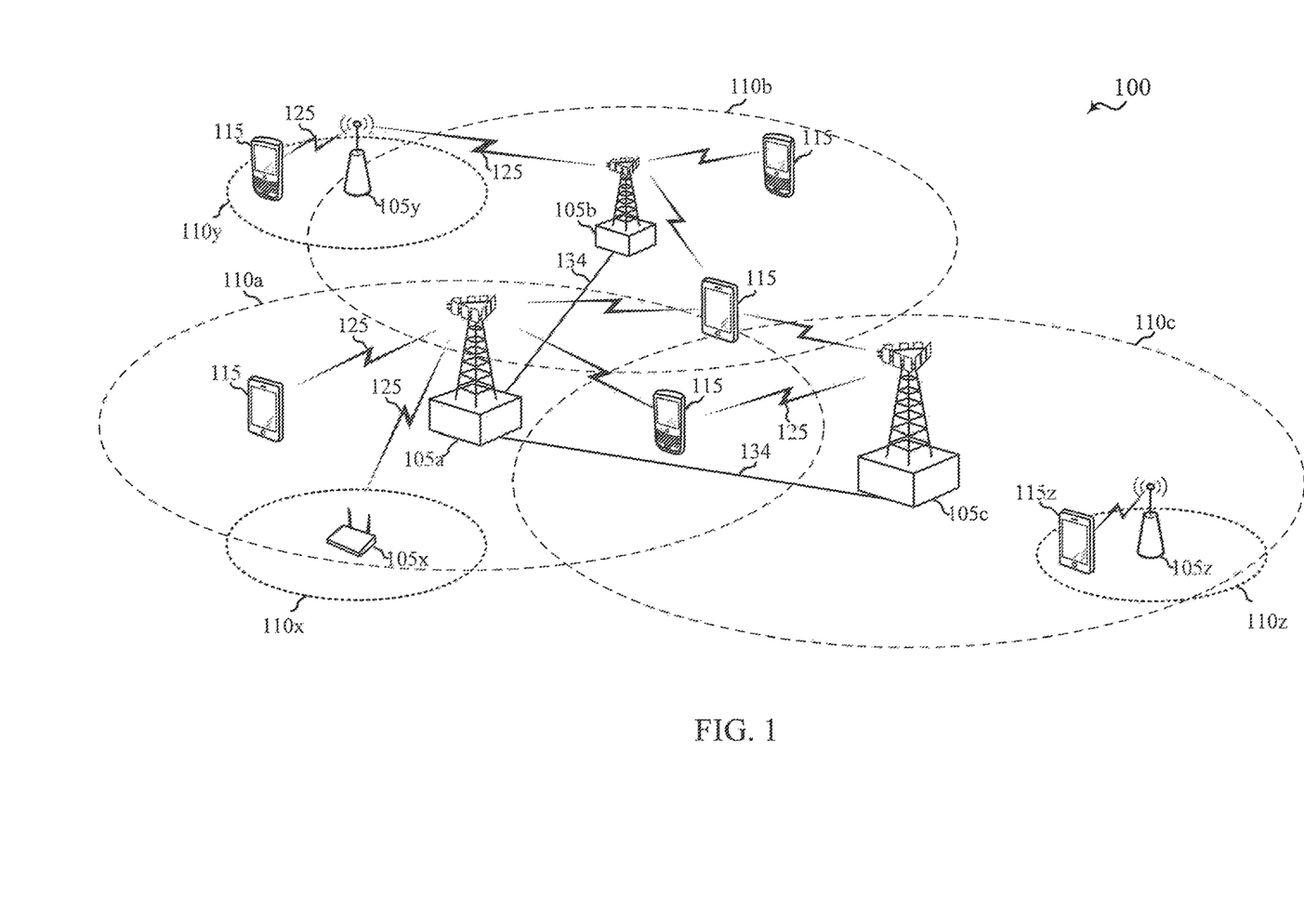
FIG. 1 is a block diagram illustrating details of a wireless communication system according to some embodiments of the present disclosure.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements.

Turning back to FIG. 1 wireless network 100 includes a number of base stations, such as may comprise evolved node Bs (eNBs), referred to herein as eNBs 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used. In implementations of wireless network 100 herein, eNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, eNBs 105a, 105b and 105c are macro eNBs for the macro cells 110a, 110b and 110c, respectively. eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells. In next generation networks (e.g., 5G networks and beyond), gNBs may provide communication coverage, similar to the way an eNB may provide communication coverage.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Although backhaul communication 134 is illustrated as wired backhaul communications that may occur between eNBs, it should be appreciated that backhaul communications may additionally or alternatively be provided by wireless communications.

Figure 2:
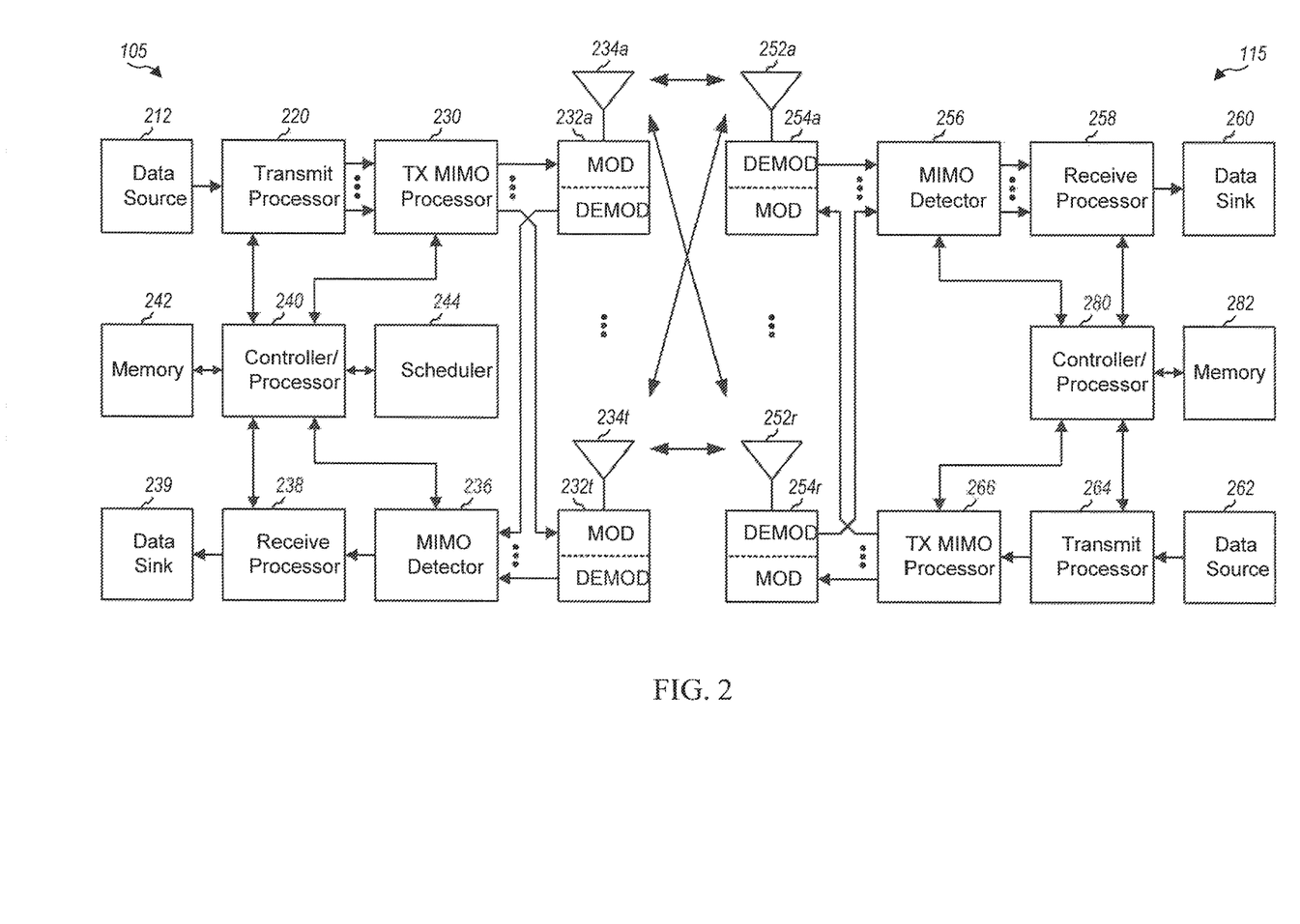
FIG. 2 is a block diagram conceptually illustrating a design of a base station/eNB/gNB and a UE configured according to some embodiments of the present disclosure.

FIG. 2 shows a block diagram of a design of base station 105 (e.g., eNB or gNB) and UE 115, which may be one of the base stations/eNBs and one of the UEs in FIG. 1. For a restricted association scenario, the eNB 105 may be small cell eNB 105z in FIG. 1, and UE 115 may be UE 115z, which in order to access small cell eNB 105z, would be included in a list of accessible UEs for small cell eNB 105z. eNB 105 may also be a base station of some other type. eNB 105 may be equipped with antennas 234a through 234t, and UE 115 may be equipped with antennas 252a through 252r.

At eNB 105, transmit processor 220 may receive data from data source 212 and control information from controller/processor 240. The control information may be for the PBCH, PCFICH, PHICH, PDCCH, etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the PSS, SSS, and cell-specific reference signal. Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from eNB 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to eNB 105. At eNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at eNB 105 and UE 115, respectively. Controller/processor 240 and/or other processors and modules at eNB 105 may perform or direct the execution of various processes for the techniques described herein. Controllers/processor 280 and/or other processors and modules at UE 115 may also perform or direct the execution of various processes for the techniques described herein. Memories 242 and 282 may store data and program codes for eNB 105 and UE 115, respectively. Scheduler 244 may schedule UEs for data transmission on the downlink and/or uplink.

Typically, communication networks include numerous physical channels over which devices in the communication networks, such as base stations and mobile devices, may communicate information to each other. A group common downlink control channel (or simply a common control channel), as described in the present disclosure, may refer to a channel that includes information that is common for a group of mobile devices. Using a common downlink control channel for communicating control information to a group of mobile devices may bring about numerous improvements to communication networks and the devices that utilize the communication networks. For example, a common downlink control channel may improve data rates, capacity, and spectral efficiency because more bandwidth may be allocated for data and less bandwidth may be allocated for UE-specific control information that is actually common for a group of mobile devices. In addition, when mobile devices are made aware of the location of the common downlink control channel before communication over the common downlink control channel occurs, power usage of the mobile devices may be reduced because the mobile devices may reduce the amount of blind decoding they perform, if any is performed.

Embodiments of the innovations described in this application may be implemented in various manners. Although this disclosure refers specifically to future-compatible group common downlink control channels, aspects of this disclosure may also describe, and be applied to, non-control channels to obtain future-compatible group common uplink or downlink channels. Therefore, the embodiments of this disclosure as described with reference to FIGS. 1-7 may also be descriptive of and applicable to general future-compatible group common channels, i.e., including non-control channels, to obtain future-compatible group common uplink or downlink channels.

Aspects of the present disclosure may improve wireless communication through the development of a common downlink control channel. Aspects of the present disclosure may also improve wireless communication by making the common downlink control channel configurable. The configurability of the common downlink control channel may make the channel future-compatible by allowing future changes to be made to the common control channel simply through modification of the configuration parameters of the common control channel.

Figure 3:
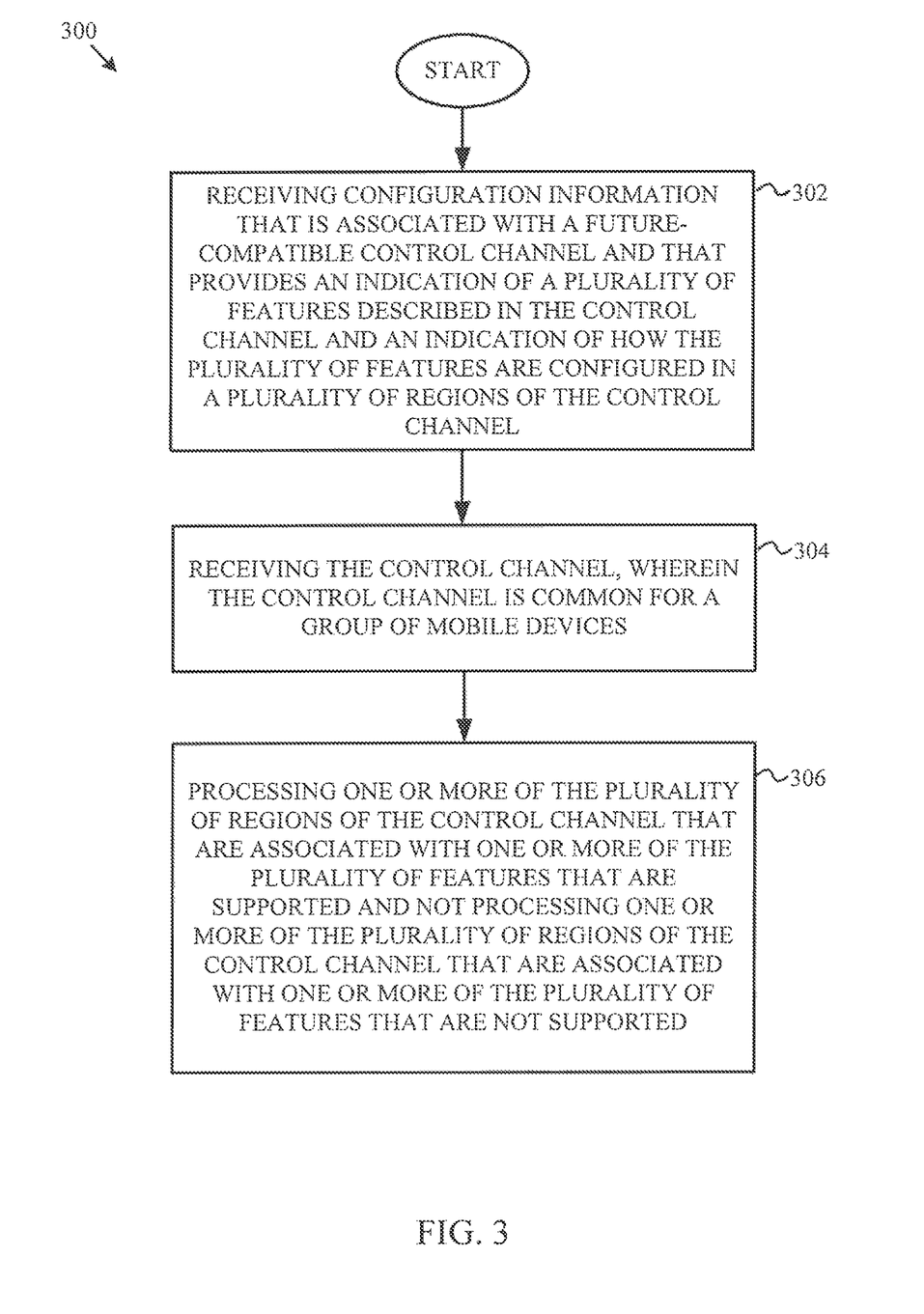
FIG. 3 is a block diagram illustrating a method for wireless communication with a future-compatible group common downlink control channel according to some embodiments of the present disclosure.
Figure 6:
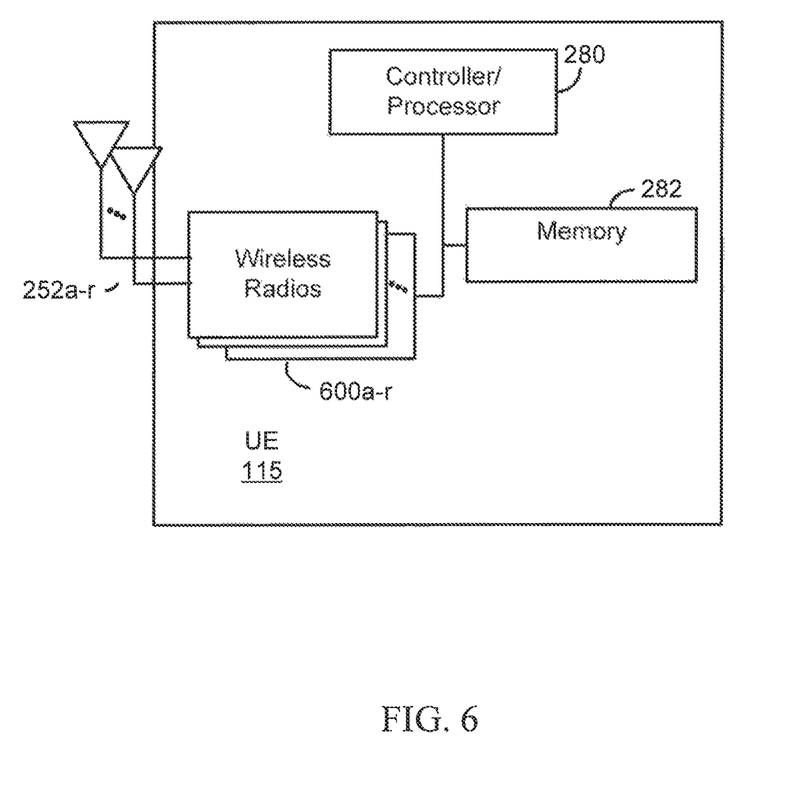
FIG. 6 is a block diagram illustrating a UE configured according to some embodiments of the present disclosure.

FIG. 3, as an example, is a block diagram illustrating a method for wireless communication with a future-compatible group common downlink control channel according to some embodiments of the present disclosure. Aspects of method 300 may be implemented with the aspects of this disclosure described with respect to FIGS. 1-2, 4, and 6-7, such as a mobile device. The example blocks will also be described with respect to UE 115 as illustrated in FIG. 6. FIG. 6 is a block diagram illustrating a UE configured according to some embodiments of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 600a-r and antennas 252a-r. Wireless radios 600a-r include various components and hardware, as illustrated in FIG. 2 for UE 115, including modulator/demodulators 254a-r, MIMO detector 256, receive processor 258, transmit processor 264, and TX MIMO processor 266.

Specifically, method 300 includes, at block 302, receiving, by a processor, configuration information that is associated with a future-compatible control channel and that provides to a mobile device an indication of a plurality of features described in the control channel and an indication of how the plurality of features are configured in a plurality of regions of the control channel. As a specific example, UE 115 may, under control of controller/processor 280, receive configuration information associated with a control channel.

Figure 4:
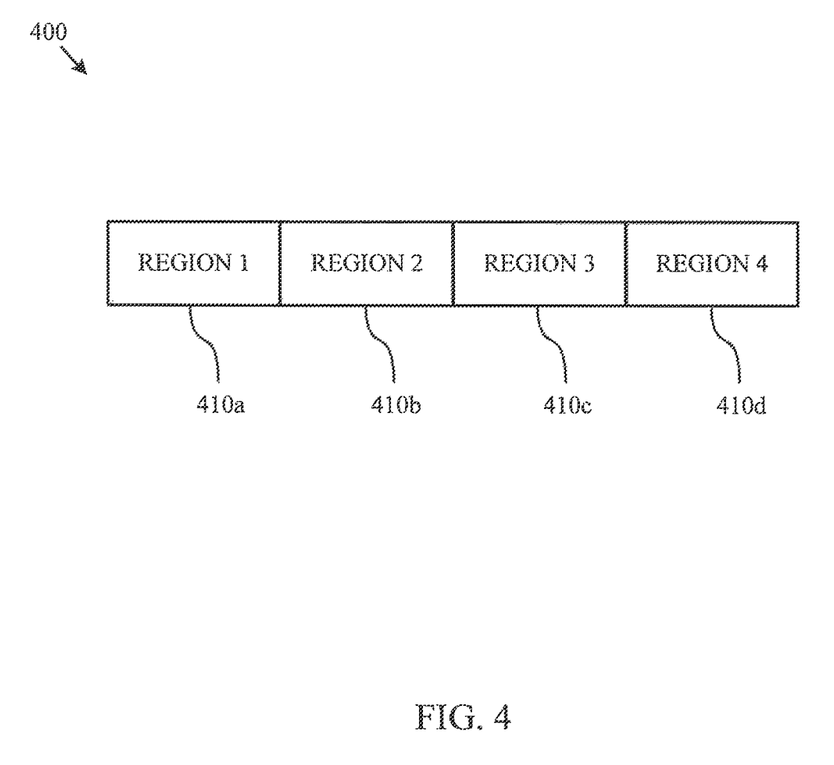
FIG. 4 shows a diagram that illustrates aspects of a future-compatible group common downlink control channel according to some embodiments of the present disclosure.

To illustrate an example structure of a common control channel, FIG. 4 shows a diagram that illustrates aspects of a future-compatible group common downlink control channel 400 according to some embodiments of the present disclosure. Future-compatible configuration enables flexibility in adding or removing functionality in the common control channel as desired (e.g., evolving standards requirements or system designs). According to some aspects, the common control channel may include fixed and/or dynamic portions (bits) and in some instances a fixed physical channel. The common control channel may be implemented via a group common PDCCH feature according to some systems; such a PDCCH could generally include a slot type indicator, a control format indicator, and other functionality for use by a recipient component. The common control channel may also be implemented based on size. For example, in one aspect, the common control channel may be implemented via reuse of a PDCCH when the common control channel is large and/or above a size threshold. In another aspect, the common control channel may be implemented via a special specific channel that is distinct from the PDCCH if the common control channel is small and/or below a size threshold.

FIG. 4 illustrates that common control channel 400 may include multiple regions 410*a-d*. Each of regions 410*a-d* may correspond to different bits which are encoded, modulated, and transmitted over resources in frequency, time, or a combination of both. The bits of each region may be jointly encoded across all of the regions, separately encoded across a subset of the regions, or individually encoded per region. Additional error checking, such as cyclic redundancy check (CRC), may be appended to the bits to ensure robustness of the common control channel 400.

The regions 410*a-d* may have varying parameters and configurations for flexible use to accommodate many future-compatibility scenarios. According to some embodiments, each of regions 410*a-d* may have the same size. For example, in one embodiment, each of regions 410*a-d* may have a size of two bits. In other embodiments, a subset of regions 410*a-d* may have different sizes while another subset of regions 410*a-d* may have the same size. In yet another embodiment, each of regions 410*a-d* may have a different size.

Common control channel 400 is illustrated in FIG. 4 with four regions only for illustrative purposes (more or less may be desired or utilized). In some embodiments, a common control channel may include more or less than four regions. And each of the regions may vary in arrangement size (e.g., payload length and bit positions within payload regions or the payload).

In some embodiments, a network device, such as a base station, may configure a plurality of regions 410*a-d* of common control channel 400 to include information describing a plurality of features. In particular, base station 105 may, under control of controller/processor 240, configure a plurality of regions 410*a-d* of common control channel 400 to include information describing a plurality of features. For example, in some embodiments, a subset of the plurality regions of the common control channel 400, for example subset regions 410*a-b*, may be configured to include information describing one or more of the plurality of features that are supported by a mobile device, such as a first mobile device receiving common control channel 400. In one embodiment, the remaining regions 410*c-d* may be void of any control information. In another embodiment, one or more of the remaining regions 410*c-d* may be configured to include information describing one or more of the plurality of features that are supported by another mobile device, such as a second mobile device also receiving common control channel 400. In other words, a base station may configure another subset of the plurality regions of the common control channel 400, such as one or more of remaining regions 410*c-d*, to include information describing one or more of the plurality of features that are supported by another mobile device, such as the second device. In some embodiments, the features supported by the first mobile device may be different than the features supported by the second mobile device, while in other embodiments, the features supported by the first mobile device may be the same as the features supported by the second mobile device. In yet another embodiment, each of regions 410*a-d* may be configured to include information describing one or more of the plurality of features that are supported by each of the mobile devices that receive common control channel 400.

According to some embodiments, a base station (e.g., eNB or gNB) may allocate different regions of the plurality of regions 410*a-d* of common control channel 400 for different features of the plurality of features. In particular, base station 105 may, under control of controller/processor 240, allocate different regions of the plurality of regions 410*a-d* of common control channel 400 for different features of the plurality of features. For example, in one embodiment, region 410*a* may be allocated to include information for a first feature, and region 410*b* may be allocated to include information for a second feature. In another embodiment, a base station may allocate different regions of the plurality of regions 410*a-d* of common control channel 400 for the same feature. In yet another embodiment, some regions, such as regions 410*a-b*, may be allocated for the same feature, while other regions, such as regions 410*c-d*, may be allocated for different features.

Examples of the features that may be described in the regions of the common control channel 400 include a slot type/format that may indicate whether a timespan/time slot is a downlink-centric slot, uplink-centric slot, or a blank slot, a control format, a starting location of a data region, and search space reduction, although other features may also be described as one of skill in the art would readily understand.

In certain embodiments, the configuration of different regions may also vary. In particular, a base station 105 may, under control of controller/processor 240, vary the configuration of different regions of common control channel 400. For example, in one embodiment, a base station may configure a subset of the different regions, such as a subset including only region 410*a* or including both region 410*a* and region 410*b*, differently, while the remaining regions that include control information, such as any one or more of regions 410*c-d*, are configured the same. In another embodiment, a base station may configure each of the regions 410*a-d* that include control information differently. In yet another embodiment, a base station may configure each of the regions 410*a-d* that include control information the same. In some embodiments, a configuration of a region may refer to how the region is coded. For example, the configuration of a region may refer to how the bits of a region of a common control channel are coded to describe the feature allocated to that region.

In some embodiments, a base station may transmit the configuration information associated with the common control channel. In particular, a base station 105 may, under control of controller/processor 240, transmit the configuration information associated with the common control channel. For example, the base station may transmit the configuration information to a mobile device. As discussed at block 302, a mobile device may be configured to receive the configuration information associated with the common control channel.

In certain embodiments, the configuration information may provide the mobile device with an indication of the plurality of features described in the common control channel and an indication of how the plurality of features are configured in the plurality of regions of the common control channel. For example, the step of transmitting configuration information may include transmitting information that provides to the mobile device an indication of a size of the control channel allocated for each of the plurality of features. Similarly, receiving configuration information, such as at block 302, may include receiving information that provides to the mobile device an indication of a size of the control channel allocated for each of the plurality of features. In particular, in one embodiment, the size of the control channel, such as the number of bits allocated for the control channel or the number of regions in the control channel, and/or the size of the regions of the control channel allocated for the features described in the respective regions may be transmitted by a base station to a mobile device for reception by the mobile device.

In some embodiments, a base station may have an option of setting the size of the common control channel from a pre-defined list of sizes that can be used for the common control channel. In particular, a base station 105 may, under control of controller/processor 240, set the size of the common control channel to a size selected from a pre-defined list of sizes that can be used for the common control channel. For example, a base station may select one of the sizes from the pre-defined list, and configure the common control channel to have the selected size. In addition, a base station may have an option of setting the size of the regions of the common control channel from a pre-defined list of sizes that can be used for the regions of the common control channel. In particular, a base station 105 may, under control of controller/processor 240, set the size of regions of the common control channel to a size selected from a pre-defined list of sizes that can be used for the regions of the common control channel. For example, a base station may select one of the sizes from the pre-defined list, and configure one or more of the regions of the common control channel to have the selected size. The size information for the common control channel and/or the regions of the common control channel may be transmitted by the base station to the mobile device for reception by the mobile device. Configurability options as discussed herein enable and provide compatibility options for communication channels (e.g., an L1 control channel). And these options enable and provide support for communication about sizing, shaping, and positioning of information within channels for a wide array of configurability features.

In another embodiment, the size of the common control channel and/or the size of the regions of the common control channel may be a fixed size known by the mobile device. For example, the size of the common control channel and/or the size of the regions of the common control channel may be set by a communication standard, and a mobile device may be configured to support the communication standard. In such an embodiment, the mobile device may know before receiving the configuration information the size of the common control channel and/or the size of the regions of the common control channel.

In certain embodiments, transmitting configuration information may also include transmitting information that provides to the mobile device an indication of the order in which the plurality of features are included in the common control channel. Similarly, receiving configuration information, such as at block 302, may include receiving information that provides to the mobile device an indication of the order in which the plurality of features are included in the common control channel.

According to some embodiments, the transmitted/received configuration information may also include the location and/or coding scheme information for the common control channel. In particular, transmitting configuration information by the base station may include transmitting the location and/or coding scheme information of the control channel. Specifically, a base station 105 may, under control of controller/processor 240, transmit the location and/or coding scheme information of the common control channel. Similarly, receiving configuration information, such as at block 302, may include receiving by the mobile device the location and/or coding scheme information of the control channel. Specifically, a mobile device 115 may, under control of controller/processor 280, receive the location and/or coding scheme information of the common control channel. In some embodiments, the location information may specify the frequency bandwidths and/or the timespans where the common control channel may be located, and/or the coding scheme information. The mobile device can use the information to decode the common control channel.

In some embodiments, various aspects of the configuration information may be transmitted by the base station to the mobile device for reception by the mobile device through various communication messages, such as through a master information block (MIB) message, a system information block (SIB) message, a radio resource control (RRC) message, or a combination of MIB, SIB, and/or RRC messages. For example, in one embodiment, a size of the common control channel may be transmitted in an MIB message and a configuration of the regions of the common control channel may be transmitted in an RRC message. In another embodiment, a location of the common control channel may be transmitted in an MIB or SIB message. In general, any combination of MIB, SIB, and/or RRC messages may be used for communication of the configuration information.

Returning to FIG. 3, at block 304, method 300 includes receiving, by the processor, the control channel, wherein the control channel is common for a group of mobile devices. Similarly, a base station may transmit the control channel that is common for a group of mobile devices. As a specific example, UE 115 may, under control of controller/processor 280, receive the common control channel. In some embodiments, transmitting the common control channel by the base station may include transmitting the common control channel at the location indicated by the configuration information, and receiving the control channel by the mobile device may include detecting and receiving the common control channel at the location indicated by the configuration information. Accordingly, because the mobile device receiving the common control channel may know the location of the common control channel, the mobile device may decode the common control channel with less or no utilization of blind decoding techniques. In other words, in some embodiments, decoding, by the mobile device, of the common control channel may not include blind decoding, or may involve a reduced number of blind decoding attempts. According to some embodiments, instead of performing significant blind decoding to decode the common control channel, other less-resource-intensive decoding schemes may be utilized.

At block 306, method 300 includes processing, by the processor, one or more of the plurality regions of the control channel that are associated with one or more of the plurality of features supported by the mobile device and not processing one or more of the plurality of regions of the control channel that are associated with one or more of the plurality of features not supported by the mobile device. As a specific example, mobile device 115 may, under control of controller/processor 280, process one or more of the plurality regions of the common control channel that are associated with one or more of the plurality of features supported by the mobile device and not process one or more of the plurality of regions of the common control channel that are associated with one or more of the plurality of features not supported by the mobile device. For example, referring to FIG. 4, a base station may configure only region 410c of common control channel 400 to include information about a feature that is supported by a first mobile device receiving the common control channel 400. The remaining regions, 410a-b and 410d, may be configured to include information about features supported by other devices that receive common control channel 400 but not supported by the first mobile device. The configuration information transmitted by the base station to the first mobile device, and similarly the configuration information received by the first mobile device, may include information informing the first mobile device that only region 410c includes information about a feature that the first mobile device supports. Based on that information, the first mobile device may process only region 410c and not process regions 410a-b and 410d. For example, in some embodiments, such as when the configuration information also includes the size of the regions of the common control channel, the first mobile device may know exactly how many bits to skip or not process because those regions do not include information about a feature that the first mobile device supports. Accordingly, in some embodiments, the first mobile device may process a first subset of regions of the plurality of regions of the common control channel, such as region 410c of common control channel 400, and a second mobile device that receives the same configuration information and control channel received by the first mobile device may process a second subset of regions of the plurality of regions of the common control channel, such as regions 410a-b of common control channel 400. In some embodiments, the first subset of regions may be different than the second subset of regions. In another embodiment, mobile devices receiving the common control channel may process all regions of the common control channel. In yet another embodiment, mobile devices receiving the common control channel may process no regions of the common control channel. In some embodiments, the subsets of the regions of the common control channel, such as the first subset and the second subset, may include only mutually exclusive regions, only the exact same regions, or may include a combination of regions that are common to multiple subsets and regions that are not common to the two subsets.

Figure 5:
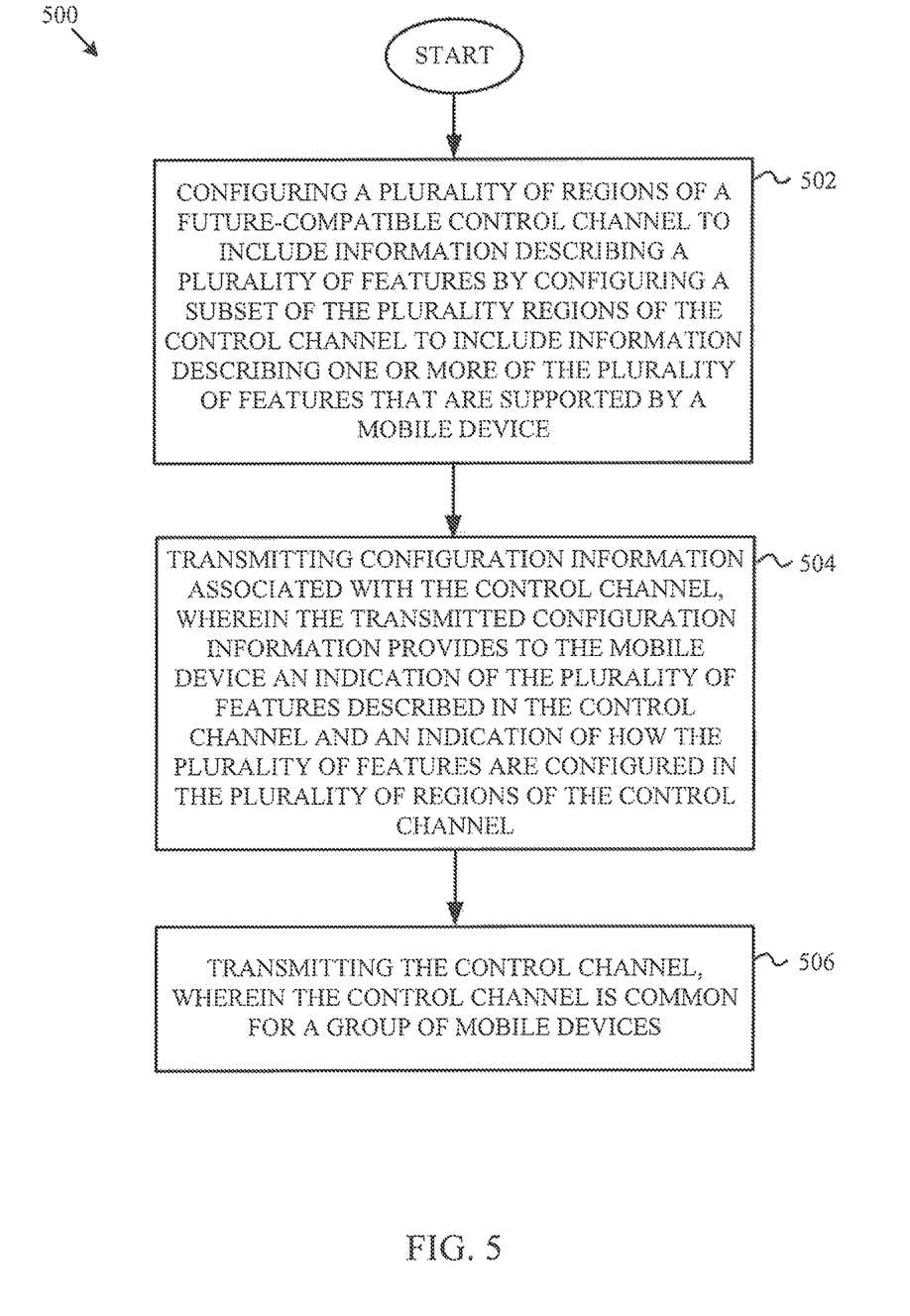
FIG. 5 is a block diagram illustrating another method for wireless communication with a future-compatible group common downlink control channel according to some embodiments of the present disclosure.
Figure 7:
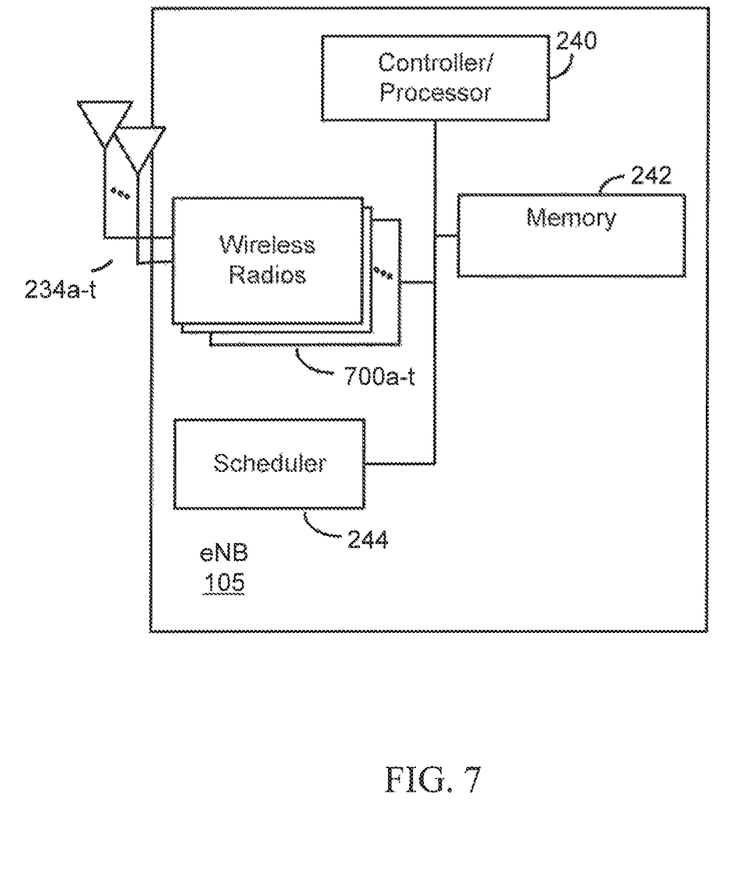
FIG. 7 is a block diagram illustrating an eNB configured according to some embodiments of the present disclosure.

FIG. 5 is a block diagram illustrating another method for wireless communication with a future-compatible group common downlink control channel according to some embodiments of the present disclosure. Aspects of method 500 may be implemented with the aspects of this disclosure described with respect to FIGS. 1-2, 4, and 6-7, such as a base station. The example blocks will also be described with respect to base station 105 as illustrated in FIG. 7. FIG. 7 is a block diagram illustrating a base station configured according to some embodiments of the present disclosure. eNB 105 includes the structure, hardware, and components as illustrated for eNB 105 of FIG. 2. For example, eNB 105 includes controller/processor 240, which operates to execute logic or computer instructions stored in memory 242, as well as controlling the components of eNB 105 that provide the features and functionality of eNB 105. eNB 105, under control of controller/processor 240, transmits and receives signals via wireless radios 700a-t and antennas 234a-t. Wireless radios 700a-t include various components and hardware, as illustrated in FIG. 2 for eNB 105, including modulator/demodulators 232a-t, MIMO detector 236, receive processor 238, transmit processor 220, and TX MIMO processor 230.

Specifically, method 500 includes, at block 502, configuring, by a processor, a plurality of regions of a future-compatible control channel to include information describing a plurality of features by configuring a subset of the plurality regions of the control channel to include information describing one or more of the plurality of features that are supported by a mobile device. At block 504, method 500 includes transmitting, by the processor, configuration information associated with the control channel, wherein the transmitted configuration information provides to the mobile device an indication of the plurality of features described in the control channel and an indication of how the plurality of features are configured in the plurality of regions of the control channel. At block 506, method 500 includes transmitting, by the processor, the control channel, wherein the control channel is common for a group of mobile devices. In some embodiments, a base station 105 may, under control of controller/processor 240, perform the steps of method 500.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in the figures may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein. For example, other methods of the disclosure may include only portions of the method steps disclosed in FIGS. 3 and 5, may include a combination of the method steps disclosed in FIGS. 3 and 5, or may include all or none of the method steps disclosed in FIGS. 3 and 5. Therefore, other methods of the disclosure may not include all the details illustrated in FIGS. 3 and 5.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, by a processor, configuration information that is associated with a future-compatible control channel and that provides an indication of a plurality of features described in the control channel and an indication of how the plurality of features are configured in a plurality of regions of the control channel;
   receiving, by the processor, the control channel, wherein the control channel is common for a group of mobile devices, includes a first subset of one or more regions that are associated with one or more of the plurality of features that are supported, and includes a second subset of one or more regions that are void of information such that the second subset is available for future configuration to include information describing another one or more of the plurality of features; and
   processing, by the processor, the first subset of one or more regions that are associated with one or more of the plurality of features that are supported and not processing the second subset of one or more regions that are void of information.

2. The method of claim 1, further comprising receiving configuration information that provides an indication of a size of the control channel allocated for each of the plurality of features and an indication of an order in which the plurality of features are included in the control channel.

3. The method of claim 1, wherein different regions of the plurality of regions of the received control channel are allocated for different features of the plurality of features, and wherein one of:
   a subset of the different regions are configured differently; and
   each of the different regions are configured differently.

4. The method of claim 1, wherein the first subset of one or more regions that is processed is different than a third subset of one or more regions of the plurality of regions of the control channel that is processed by another mobile device that also receives the same configuration information and control channel.

5. The method of claim 1, further comprising:
receiving configuration information that includes a location and/or coding scheme information of the control channel; and
detecting the control channel at the location indicated by the configuration information.

6. The method of claim 1, further comprising decoding the control channel, wherein decoding does not include blind decoding or involves a reduced number of blind decoding.

7. The method of claim 1, wherein at least one of:
the configuration information includes at least a size of the control channel; and
the control channel has a fixed size known by a mobile device that receives the configuration information and control channel.

8. An apparatus configured for wireless communication, the apparatus comprising:
at least one processor; and
a memory coupled to the at least one processor,
wherein the at least one processor is configured:
to receive configuration information that is associated with a future-compatible control channel and that provides an indication of a plurality of features described in the control channel and an indication of how the plurality of features are configured in a plurality of regions of the control channel;
to receive the control channel, wherein the control channel is common for a group of mobile devices, includes a first subset of one or more regions that are associated with one or more of the plurality of features that are supported, and includes a second subset of one or more regions that are void of information such that the second subset is available for future configuration to include information describing another one or more of the plurality of features; and
to process the first subset of one or more regions that are associated with one or more of the plurality of features that are supported and not processing the second subset of one or more regions that are void of information.

9. The apparatus of claim 8, wherein the at least one processor is further configured to receive configuration information that provides an indication of a size of the control channel allocated for each of the plurality of features and an indication of an order in which the plurality of features are included in the control channel.

10. The apparatus of claim 8, wherein different regions of the plurality of regions of the received control channel are allocated for different features of the plurality of features, and wherein one of:
a subset of the different regions are configured differently; and
each of the different regions are configured differently.

11. The apparatus of claim 8, wherein the first subset of one or more regions that is processed is different than a third subset of one or more regions of the plurality of regions of the control channel that is processed by another mobile device that also receives the same configuration information and control channel.

12. The apparatus of claim 8, wherein the at least one processor is further configured:

to receive configuration information that includes a location and/or coding scheme information of the control channel; and
to detect the control channel at the location indicated by the configuration information.

13. The apparatus of claim 8, wherein the at least one processor is further configured to decode the control channel, wherein decoding does not include blind decoding or involves a reduced number of blind decoding.

14. The apparatus of claim 8, wherein at least one of:
the configuration information includes at least a size of the control channel; and
the control channel has a fixed size known by a mobile device that receives the configuration information and control channel.

15. A method of wireless communication, comprising:
configuring, by a processor, a plurality of regions of a future-compatible control channel to include information describing a plurality of features by configuring a subset of the plurality regions of the control channel to include information describing one or more of the plurality of features that are supported by a mobile device and by configuring at least a portion of the plurality of regions not part of the subset to be void of information such that the at least a portion is available for future configuration to include information describing another one or more of the plurality of features;
transmitting, by the processor, configuration information associated with the control channel, wherein the transmitted configuration information provides to the mobile device an indication of the plurality of features described in the control channel and an indication of how the plurality of features are configured in the plurality of regions of the control channel; and
transmitting, by the processor, the control channel, wherein the control channel is common for a group of mobile devices.

16. The method of claim 15, further comprising transmitting configuration information that provides to the mobile device an indication of a size of the control channel allocated for each of the plurality of features and an indication of an order in which the plurality of features are included in the control channel.

17. The method of claim 15, further comprising:
allocating different regions of the plurality of regions of the control channel for different features of the plurality of features; and
configuring a subset of the different regions differently or configuring each of the different regions differently.

18. The method of claim 15, further comprising configuring another subset of the plurality regions of the control channel to include information describing one or more of the plurality of features that are supported by another mobile device, wherein the one or more of the plurality of features that are supported by the mobile device are different than the features supported by the another mobile device.

19. The method of claim 15, further comprising:
transmitting configuration information that includes a location and/or coding scheme information of the control channel; and
transmitting the control channel at the location indicated by the configuration information.

20. The method of claim 15, wherein at least one of:
the configuration information includes at least a size of the control channel; and
the control channel has a fixed size known by the mobile device.

21. An apparatus configured for wireless communication, the apparatus comprising:
- at least one processor; and
- a memory coupled to the at least one processor, wherein the at least one processor is configured:
  - to configure a plurality of regions of a future-compatible control channel to include information describing a plurality of features by configuring a subset of the plurality regions of the control channel to include information describing one or more of the plurality of features that are supported by a mobile device and by configuring at least a portion of the plurality of regions not part of the subset to be void of information such that the at least a portion is available for future configuration to include information describing another one or more of the plurality of features;
  - to transmit configuration information associated with the control channel, wherein the transmitted configuration information provides to the mobile device an indication of the plurality of features described in the control channel and an indication of how the plurality of features are configured in the plurality of regions of the control channel; and
  - to transmit the control channel, wherein the control channel is common for a group of mobile devices.

22. The apparatus of claim 21, wherein the at least one processor is further configured to transmit configuration information that provides to the mobile device an indication of a size of the control channel allocated for each of the plurality of features and an indication of an order in which the plurality of features are included in the control channel.

23. The apparatus of claim 21, wherein the at least one processor is further configured to:
- allocate different regions of the plurality of regions of the control channel for different features of the plurality of features; and
- configure a subset of the different regions differently or configure each of the different regions differently.

24. The apparatus of claim 21, wherein the at least one processor is further configured to configure another subset of the plurality regions of the control channel to include information describing one or more of the plurality of features that are supported by another mobile device, wherein the one or more of the plurality of features that are supported by the mobile device are different than the features supported by the another mobile device.

25. The apparatus of claim 21, wherein the at least one processor is further configured:
- to transmit configuration information that includes a location and/or coding scheme information of the control channel; and
- to transmit the control channel at the location indicated by the configuration information.

26. The apparatus of claim 21, wherein at least one of:
- the configuration information includes at least a size of the control channel; and
- the control channel has a fixed size known by the mobile device.

* * * * *